O. M. PAGE.
CREAM SEPARATOR.
APPLICATION FILED JULY 27, 1914.

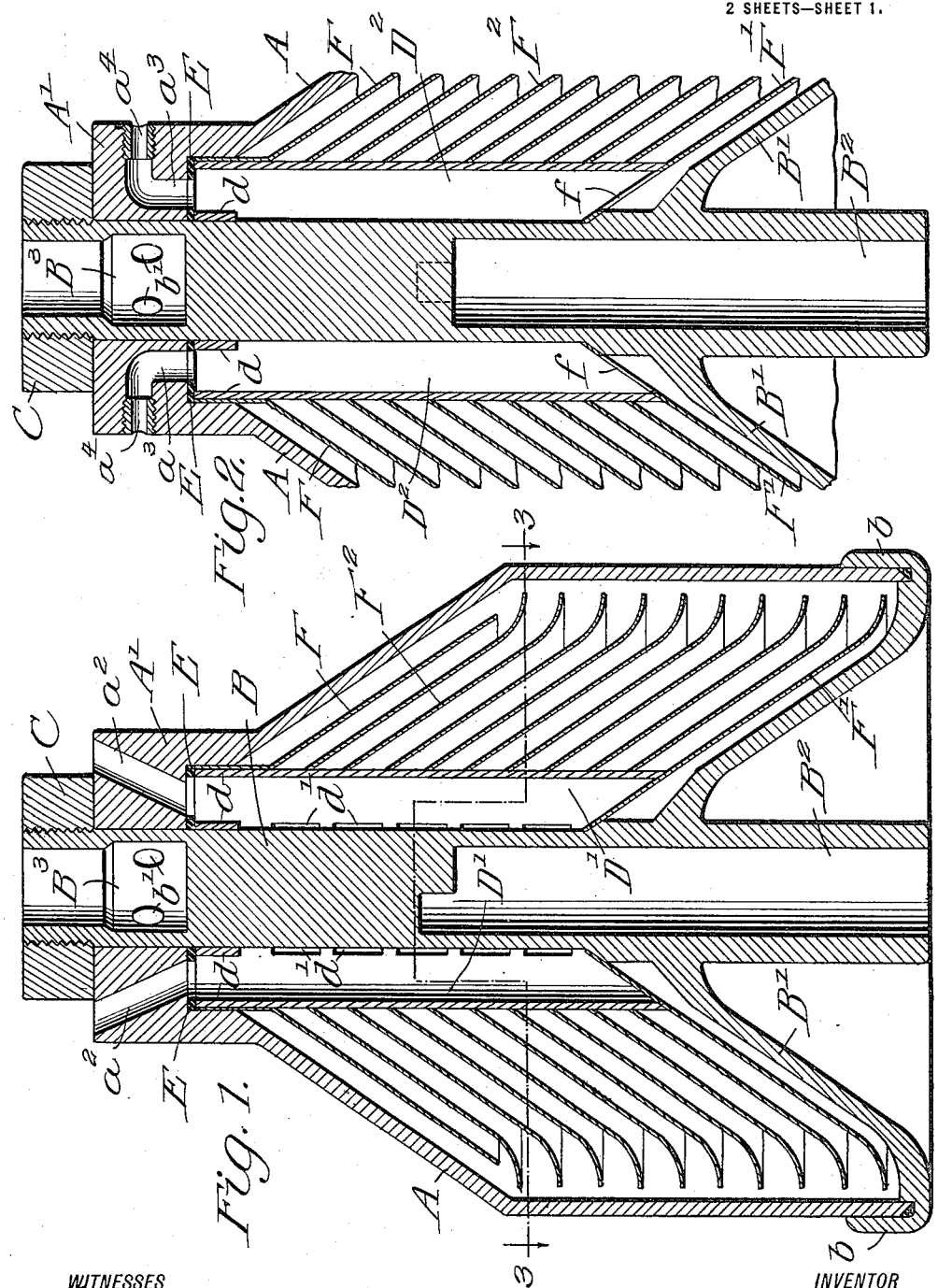

1,150,533.

Patented Aug. 17, 1915.
2 SHEETS—SHEET 2.

WITNESSES
Samuel E. Wade.
Myron G. Clear.

INVENTOR
Otha M. Page
BY Munn & Co.
ATTORNEYS

UNITED STATES PATENT OFFICE.

OTHA MARTIN PAGE, OF LA FAYETTE, ILLINOIS.

CREAM-SEPARATOR.

1,150,533. Specification of Letters Patent. Patented Aug. 17, 1915.

Application filed July 27, 1914. Serial No. 853,438.

*To all whom it may concern:*

Be it known that I, OTHA M. PAGE, a citizen of the United States, and a resident of La Fayette, in the county of Stark and State of Illinois, have invented an Improvement in Cream-Separators, of which the following is a specification.

My present invention relates to mechanical separators, and more particularly to cream separators, my object being to provide certain new and useful improvements therein including a single member forming separate cream and skim milk outlets, such as will promote simplicity and economy and, at the same time increase its efficiency in the operations for which it is intended.

These objects I attain by means of the construction set forth in the accompanying drawings, forming a part of this specification, and in which—

Figure 3:
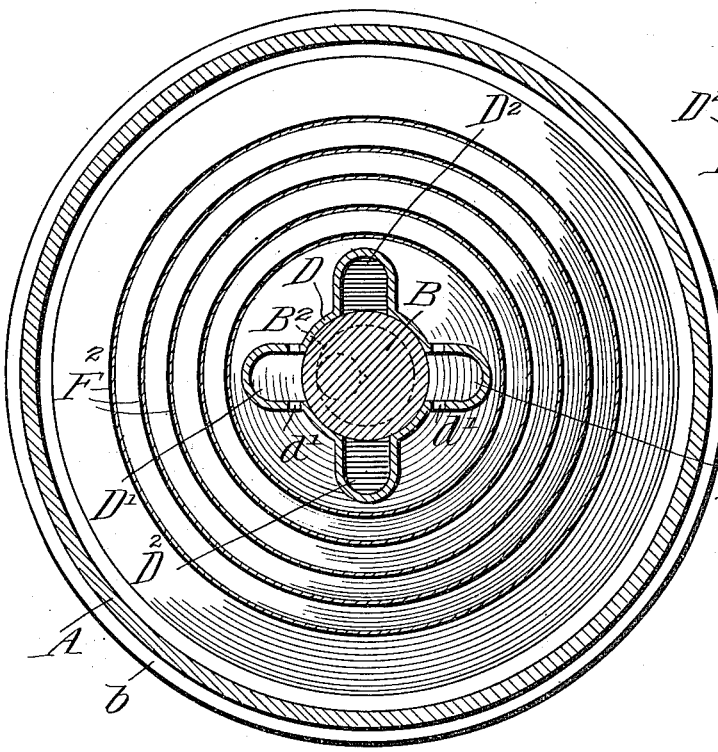
Figure 5:
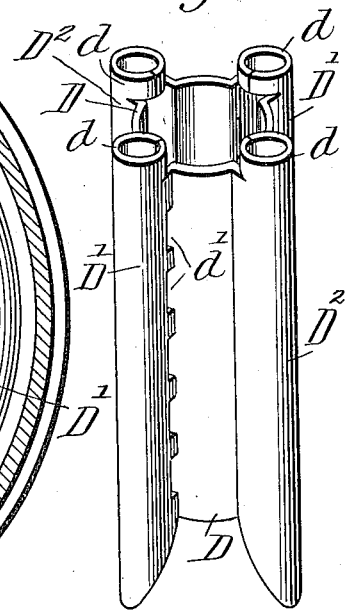
Figure 4:
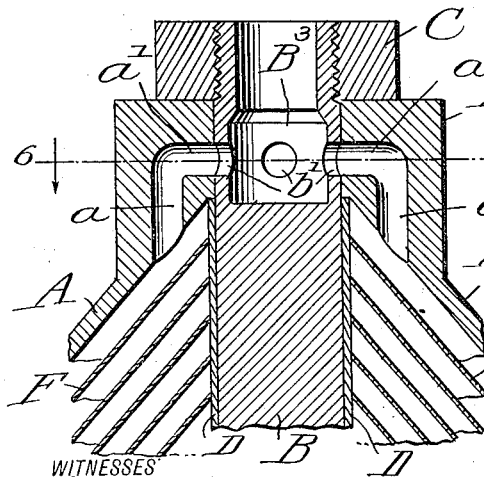

Figure 1 is a central vertical section taken through my improved separator. Fig. 2 is a similar view taken substantially at right angles to Fig. 1 and with parts broken away. Fig. 3 is a horizontal section taken therethrough substantially on line 3—3 of Fig. 1. Fig. 4 is a vertical section through the upper or head portion of the bowl, taken substantially at an angle of 45° with respect to the sections of Figs. 1 and 2. Fig. 5 is a detail perspective view of the outlet cylinder removed, and Fig. 6 is a horizontal section taken through the head of the bowl substantially on line 6—6 of Fig. 4.

Referring now to these figures, my invention which resides in the bowl of the separator irrespective of the particular means by which the bowl may be rotated to bring about the desired centrifugal action, includes a bowl A having an integral head A' with a relatively flat top and an axial bore through which the upper end of the driving stem B projects as clearly seen in Figs. 1, 2 and 4, this stem being integral with the bowl base B' and having an axial bore $B^2$ in its lower end into which the upper portion of the driving shaft (not shown) projects in use.

It will be noted that the base B' is substantially conical in shape as is usual and that its flanged outer edge $b$ is provided with an internal annular groove adapted to receive a packing strip and to accommodate the lower edge of the bowl body A in fluid tight relation, the upper end of the stem B being externally threaded to receive a nut C adapted to bear upon the flat upper end of the bowl head A' in order to couple the body and the base of the bowl in such relation in use.

Figure 6:
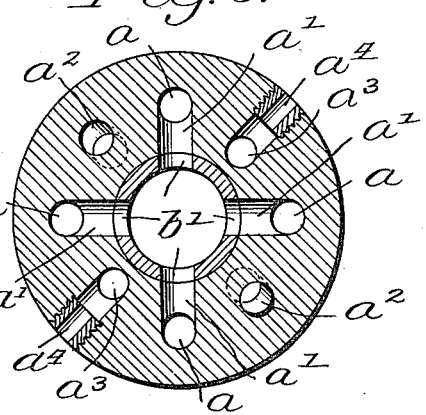

It will be noted from Figs. 4 and 6 that the head A' of the bowl body A is provided with four vertical channels $a$ disposed around the axial bore of the head before mentioned, at substantially 90° with respect to one another, the upper inwardly presented ends $a'$ of which channels are in registry with apertures $b'$ through the wall of the stem B surrounding its upper axial bore $B^3$, the lower inner ends of channels $a$ communicating with the interior of the bowl body A as best shown in Fig. 4 whereby to form inlets by which the milk to be separated may be introduced within the bowl.

The bowl head A' is also provided with vertically inclined cream outlet channels $a^2$ arranged upon diametrically opposite sides of its bore, the outer ends of which cream outlet channels open exteriorly through the flat top of the head A' as best seen in Fig. 1.

As shown particularly in Fig. 2 the head A' is also provided with skim milk outlet channels $a^3$ extending vertically therein and arranged upon diametrically opposite sides of its bore and in a plane at right angles to a plane connecting the cream outlet channels $a^2$, the upper angular ends of the skim milk outlet channels $a^3$ opening exteriorly through relatively opposite sides of the head A' and being provided with tubular regulating screws $a^4$ threaded therein.

It will thus be noted that the several outlet channels $a^2$ and $a^3$ extend between and alternate with the several inlet channels $a$ as may be clearly seen by reference to Fig. 6.

Disposed snugly around the stem B within the bore, and readily removable therefrom, is a cylindrical outlet member D, the wall of which is pressed outwardly at diametrically opposite points to provide integral outlet tubes arranged in diametrically opposing pairs D' and $D^2$ for cream and skim milk respectively, the upper end of this cylinder D being partially cut away and provided with extensions bent inwardly to form rings $d$ around the upper ends of the several tubes D' and $D^2$ and projecting above the upper end of the cylinder D to fit within the conformable recesses in the lower inner portion of the bowl head A' at the inner ends of the cream and skim milk channels $a^2$ and $a^3$ with which the respective cream and skim milk tubes D' and $D^2$ thus register, space being preferably left between the head A' and the rings d for the disposition of packing E as shown in Figs. 1 and 2.

The upper and lower separating disks F and F' which are of the usual conical shape, are secured to the upper and lower portions of the cylinder D respectively, the lower disk F' closing the lower beveled ends of the cream outlet tubes D' as shown in Fig. 1 and having apertures f registering with the lower beveled ends of the skim milk outlet tubes $D^2$ as shown in Fig. 2. As shown in Fig. 1, however, the cream outlet tubes D' have a series of slotted apertures d' in their sides which communicate with the space between the upper and lower disks F and F' and thus between the several intermediate disks $F^2$, which latter may be secured to the cylinder D or carried thereby in any suitable manner. Thus with the parts in operative position as shown in Fig. 1, milk to be separated is introduced into the upper bore $B^3$ of the stem B and passes downwardly into the bowl body through inlet channels a of the head. As soon as the centrifugal motion of the bowl starts the separating action, the cream is carried inwardly between the several separating disks and into the cream outlet tubes D' through their side openings d', passing upwardly through these tubes and out through the cream outlet channels $a^2$ registering therewith. After the milk has been thus separated, the skim milk passes down to the bottom of the bowl and then up through the lower disk apertures f into the skim milk outlet tubes $D^2$ and thence on upwardly through these tubes and out through the skim milk outlet channels $a^3$.

From this it will be seen that a separator such as proposed by my invention is simple and economical in its construction and will be highly efficient in use, in addition to the fact that its several parts may be readily dismantled for purposes of repair, substitution or cleaning and may be readily assembled for use again, without necessitating skill in either operation, the nut C being simply screwed off of the stem B, the bowl body A lifted therefrom and the cylindrical outlet member D may be then lifted off of the stem B without trouble.

I claim:

1. In a liquid separator, the combination with a separator bowl provided with inlet and outlet channels and an axial stem, of a cylindrical outlet member removably disposed upon the said stem and having vertical outlet tubes formed therearound and communicating at their upper ends with the said outlet channels, certain of said tubes being imperforate throughout their length and open at their bases, and the other tubes being perforated therealong and having closed bases, substantially as described.

2. In a liquid separator, the combination with a separator bowl provided with upper inlet and outlet channels and a stem projecting axially therethrough, of a plurality of outlet tubes extending vertically around the said stem and removable therefrom, the upper ends of which tubes register with the said outlet channels, certain of said tubes being imperforate throughout their length and open at their bases, and the other tubes being perforated therealong and having closed bases.

3. In a liquid separator, the combination with a separator bowl, having a central axial stem of a cylindrical outlet member mounted around the stem and provided with outlet tubes, certain of which tubes are open at their lower ends and certain others of which are closed at their lower ends and provided with series of side apertures in their length.

4. In a liquid separator, the combination with a separator bowl having outlet channels and an axial stem, of a removable outlet member mounted around the stem and consisting of a cylinder having portions of its wall pressed outwardly at spaced points to form longitudinal outlet tubes, the upper ends of which tubes are provided with rings projecting above the cylinder and registering with the outlet channels.

OTHA MARTIN PAGE.

Witnesses:
B. B. Harris,
Joshua Grant.

Copies of this patent may be obtained for five cents each, by addressing the "Commissioner of Patents, Washington, D. C."